US00RE34033E

United States Patent [19]

Godette

[11] E Patent Number: Re. 34,033

[45] Reissued Date of Patent: Aug. 18, 1992

[54] MANUALLY FOLDABLE TOP FOR AUTOMOBILE VEHICLES

[75] Inventor: Robert G. Godette, Saugus, Calif.

[73] Assignee: Wickes Manufacturing Company, Southfield, Mich.

[21] Appl. No.: 659,438

[22] Filed: Feb. 22, 1991

Related U.S. Patent Documents

Reissue of:

[64] Patent No.: 4,741,571
Issued: May 3, 1988
Appl. No.: 941,778
Filed: Dec. 15, 1986

U.S. Applications:

[63] Continuation of Ser. No. 432,007, Nov. 6, 1989, abandoned.

[51] Int. Cl.[5] ..... B60J 7/12

[52] U.S. Cl. ..... 296/107; 296/117; 296/201; 296/122; 411/398

[58] Field of Search ..... 296/107, 116, 117, 146 (U.S. only), 296/147, 201, 120.1, 121, 122; 411/398, 539

[56] References Cited

U.S. PATENT DOCUMENTS

| | | | |
|---|---|---|---|
| 232,299 | 9/1880 | Pritchard | 296/121 |
| 1,044,055 | 11/1912 | Johnson et al. | 411/398 X |
| 2,540,454 | 2/1951 | Milhan | 296/117 |
| 2,768,857 | 10/1956 | Albrecht | 296/117 |
| 3,216,763 | 11/1965 | Heincelman | 296/121 |
| 3,333,362 | 8/1967 | Kostin et al. | 296/146 X |
| 3,666,317 | 5/1972 | Podwys | 296/121 X |
| 3,919,952 | 11/1975 | Lund | 411/398 X |
| 3,994,524 | 11/1976 | Lehmann | 296/107 |
| 4,572,570 | 2/1986 | Trucco | 296/107 |
| 4,693,509 | 9/1987 | Moy et al. | 296/201 |

FOREIGN PATENT DOCUMENTS

| | | | |
|---|---|---|---|
| 413467 | 7/1934 | United Kingdom | 296/107 |

*Primary Examiner*—Dennis H. Pedder
*Attorney, Agent, or Firm*—David A. Greenlee

[57] ABSTRACT

A manually foldable top for automobile vehicles is disclosed which includes a pivot bracket for installing the top on a vehicle body and further includes a spring assembly operatively attached to a side arm assembly for movement of the foldable top from a closed position to an open position; an arcuate slotted hinge mechanism for moving a back window on the foldable top between an open and a closed position, including a seal for forming a sealed window when the window is in the closed position; a linkage and securing assembly for securing the top to the vehicle body when the top is in the closed position; and, a camming bolt for adjusting the position of the foldable top with respect to the vehicle body.

11 Claims, 7 Drawing Sheets

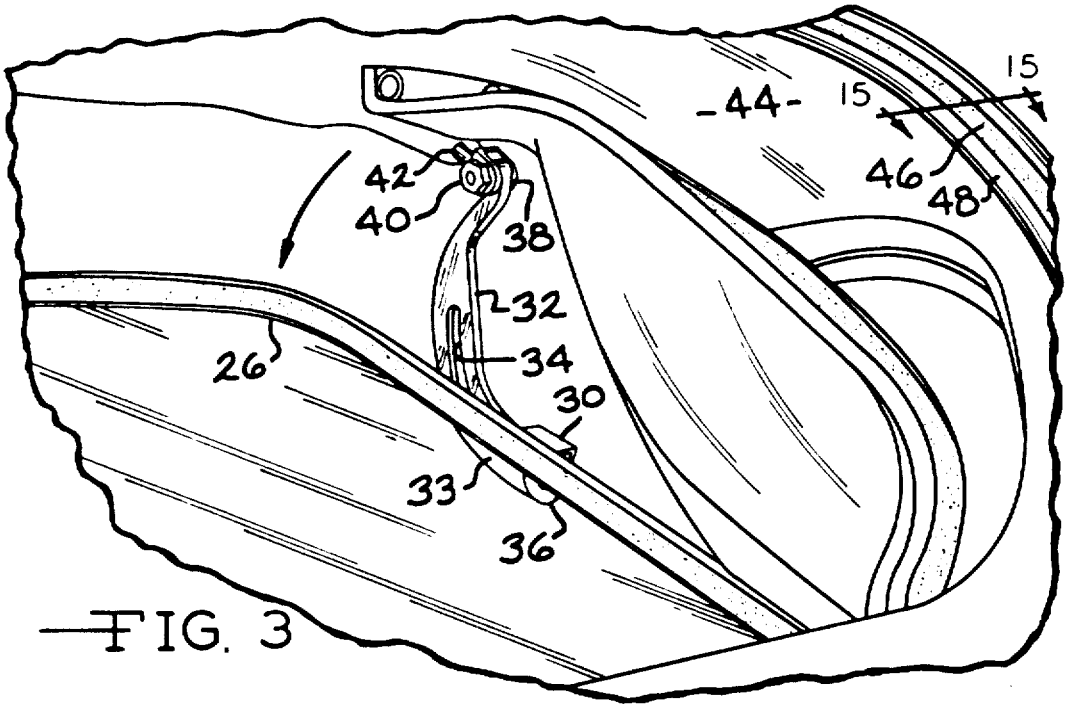
FIG. 3
FIG. 2
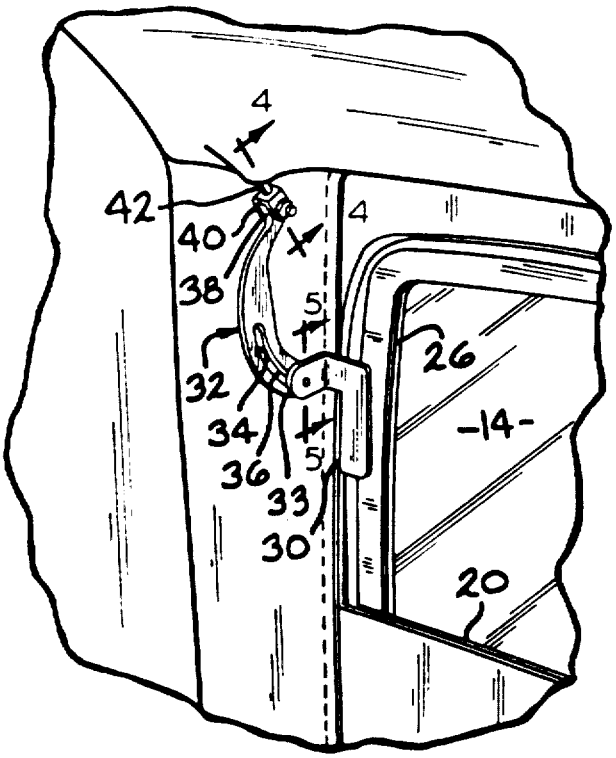
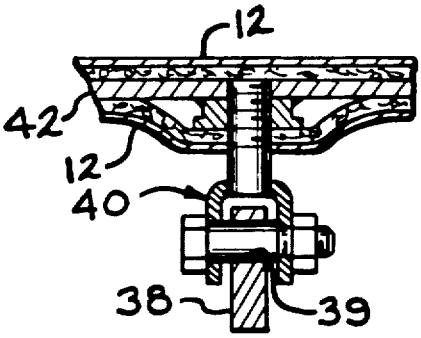
FIG. 4
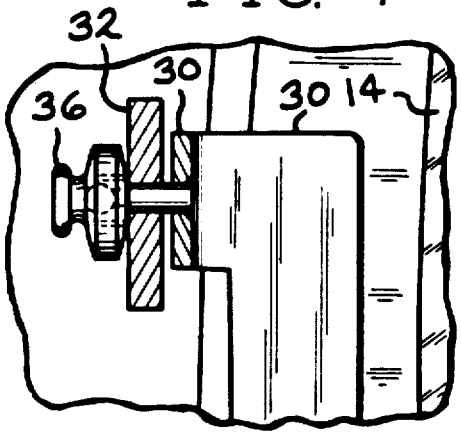
FIG. 5

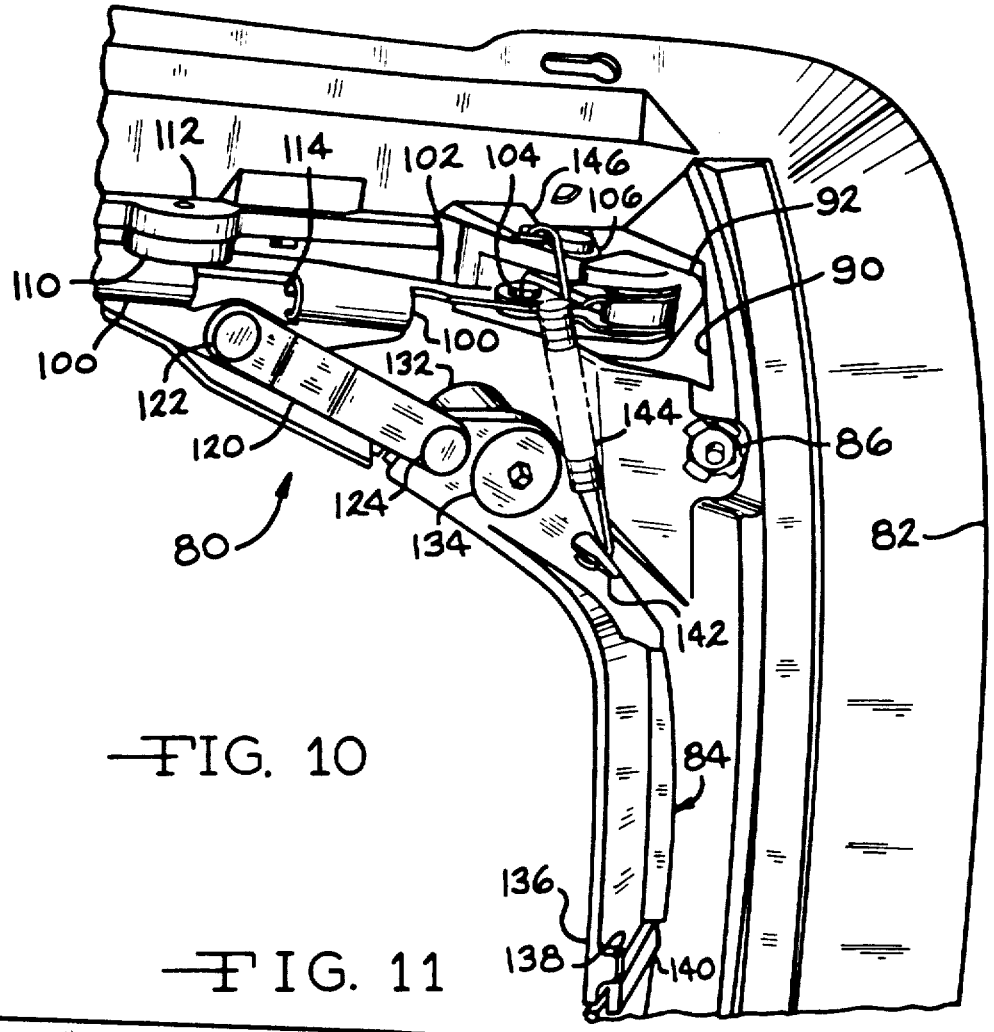
FIG. 10
FIG. 11
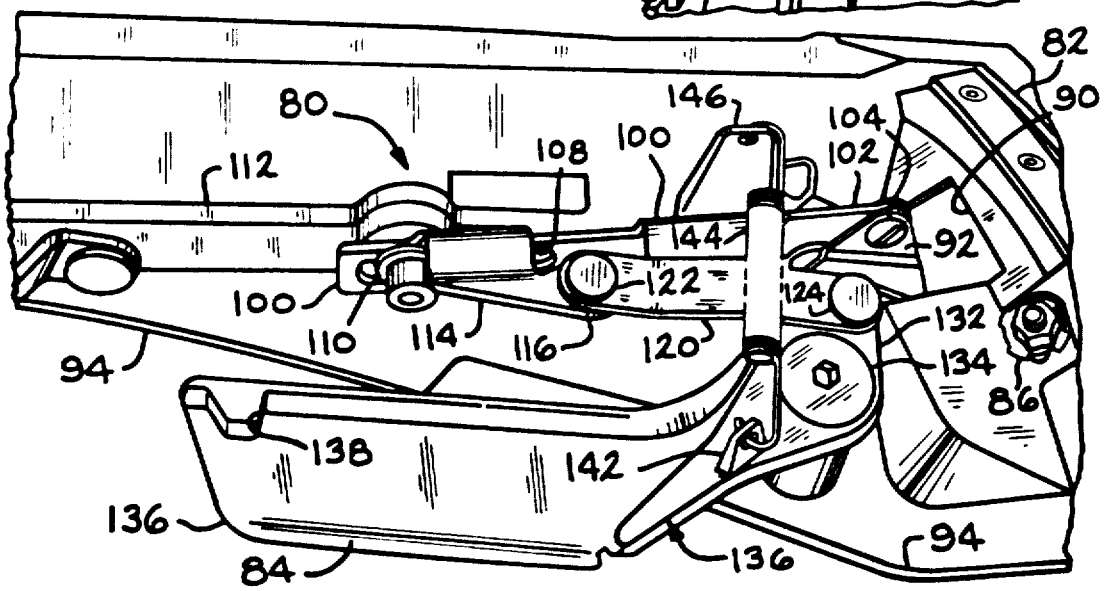

MANUALLY FOLDABLE TOP FOR AUTOMOBILE VEHICLES

Matter enclosed in heavy brackets [ ] appears in the original patent but forms no part of this reissue specification; matter printed in italics indicates the additions made by reissue.

*This is a continuation of U.S. Ser. No. 07/432,007, filed Nov. 6, 1989, now abandoned, which is a reissue of U.S. Ser. No. 06/941,778, filed Dec. 15, 1986, now U.S. Pat. No. 4,741,571.*

BACKGROUND OF THE INVENTION

The present invention relates to a manually foldable fabric top for automobile vehicles.

While foldable tops for automobile vehicles are generally known and various control linkages have been devised for folding the top into an open position, there are various drawbacks of the currently used foldable tops. In particular, many foldable tops are not useful with a glass window or backlite. Rather, such tops use a flexible or rigid plastic material which tends to cloud upon prolonged exposure to sunlight and which is easily scratched. Those foldable tops which do [not] contain glass backlites have cumbersome mechanisms in which to detach or fold the back window to an open position.

Also, various foldable tops require the use of a special wrench or latching mechanism in order to disengage the roof top from its closed or locked position. This often causes a delay in opening or closing of the foldable top. Further, the prior art foldable tops are complicated to operate and demand that the operator have an accurate working knowledge of all the necessary [stops] *steps* and procedures in order to operate the foldable top without damage to the automobile vehicle or to the top itself.

Further, various past designs of convertible tops entail complex linkage mechanisms and thus either tend to have sloppy tolerances with those mechanisms, which causes leaking or incomplete seals around the windows or windshield, or have tolerances which are too low and cause a torquing or bending of the linkage mechanisms, which in turn cause stress and premature breakage of the parts and/or incomplete seals and roof leakage. Also, these linkage mechanisms cause the automobile makers to encounter many difficulties during the manufacturing and installation of the foldable top on the vehicle body.

It is therefore the aim of the present invention to provide a manually foldable top for automobile vehicles which does not have the above described shortcomings and which, in particular, enables the manufacturer to efficiently mount the folding top on the vehicle body.

It is a further aim on the invention to provide a foldable top for automobile vehicles which is useful with glass backlites in order to take advantage of positive aspects of using a glass backlite; for example, glass backlites can be used with defrosters or heaters and glass does not cloud or fog or become easily scratched due to manipulation or movement.

As can be appreciated, considerable time would be saved if a foldable top for automobile vehicles could be employed which requires no special instructions or knowledge and which is easy to operate while sacrificing none of the advantages of standard hard top automobile vehicle roofs such as clear visibility through a heated or defroster type backlite and secure seals around the windows and windshield.

SUMMARY OF THE INVENTION

The present invention is directed to a manually foldable top for automobile vehicles which includes means for installing the foldable top on a vehicle body including a spring assembly operatively attached to a side arm assembly for movement of the top from a closed position to an open position; means for moving a back window on the top between an open and a closed position, including means for forming a sealed window when the window is in the closed position; means for securing the top to the vehicle body when the top is in the closed position, including a linkage and securing assembly which releaseably attaches to the vehicle body; and, means for adjusting the position of the foldable top with respect to the vehicle body during installation of the foldable top on the vehicle body and during the movement of the foldable top between the open and closed positions.

In particular the means for moving the back window on the foldable top between the open and closed position includes a hinge mechanism having a first end connected to the back window and a second end connected to the foldable top. The hinge mechanism includes a mounting bracket connected to an interior portion of the back window and a slotted hinge mechanism operatively connected thereto. The slotted hinge mechanism has a generally arcuate shape and includes a generally arcuate slot positioned in the first end of the hinge mechanism adjacent the mounting bracket. The hinge mechanism is pivotally connected to the mounted bracket by a nut assembly. The second end of the slotted hinge mechanism is operatively attached to a first portion of the foldable top by a pivotally mounted nut and bolt assembly for movement of the back window between the open and closed positions.

The back window is sealably mounted to a portion of the foldable top, which fabric portion has a self-adhesive material attached to the foldable top adjacent the back window. The back window also has an opposing self-adhesive material in opposing adjacent relationship to the self-adhesive material on the foldable top such that when the window is in a closed position the self-adhesive materials are engaged to form a seal. In a preferred embodiment the back window is made substantially of glass.

Further, the linkage and securing assembly is operatively connected to a header assembly positioned in a generally parallel relationship to a front windshield frame on the vehicle body when the foldable top is in the closed position. The header assembly includes a locating pin and a securing hook which engageably fit into corresponding apertures in the windshield frame and vehicle body when the top is in the closed positions such that the top is securely fastened to the vehicle body.

The front linkage and securing assembly includes a lever mechanism connected at a first end to the securing hook by a pin assembly. The securing hook pivots around the pin assembly in a direction away from the front linkage and securing assembly and further pivots around a fixed point on the header assembly through an aperture in the header assembly such that the securing hook is released from its locked position on the header assembly when the foldable top is moved to its open position.

The lever mechanism further includes a slot located in opposed relationship to the pin assembly and further including a second pin assembly extending through the slot which operatively mounts a support bracket to the linkage and securing assembly. The lever mechanism further includes a housing portion extending in a direction away from the support bracket and terminating in an extending portion which is operatively connected to a connecting lever. The connecting lever includes a first pivot pin extending through the terminal portion of the housing portion which connects the connecting lever to the lever mechanism. The connecting lever includes a second pivot pin in opposing relationship to the first pivot pin which extends through the connecting lever and operatively connects the connecting lever to a handle. The handle is operatively connected to the lever mechanism through the connecting lever and includes a main pivot pin assembly located at a first end of the handle adjacent the second pivot pin. The handle also includes a second end and a notched portion on the handle which engages a securing mechanism on the header assembly. The movement of the handle in a direction away from the securing mechanism on the header assembly operatively releases the locating pin and the securing hook from the windshield frame.

The means for adjusting the position of the foldable top with respect to the vehicle body includes a multiple adjustment mechanism including a balance link operatively connected to the spring assembly by a camming bolt positioned within an aperture in the spring assembly. The camming bolt includes an ecentrically mounted cam portion and a centrally mounted portion, which is engageably mounted within the aperture in the spring assembly. The aperture includes a plurality of holes arranged in a substantially linear manner along the aperture. Each of the holes defines a diameter which is complementary with the diameter of the centrically mounted portion of the camming bolt such that when the centrically mounted portion extends through a hole, the camming bolt is secured with that particular hole.

BRIEF DESCRIPTION OF THE DRAWINGS

FIG. 2 is a perspective view of the interior rear portion of the manually foldable top showing a backlite in a closed position.

FIG. 3 is a perspective view of the interior rear portion of the manually foldable top showing the backlite in an open position.

FIG. 4 is a view taken along line 4—4 in FIG. 2.

FIG. 5 is a view taken along line 5—5 in FIG. 2.

FIG. 10 is a plan view of a linkage assembly, as shown in a locked or closed position.

FIG. 11 is a perspective view of the linkage assembly shown in FIG. 10 in an unlocked or open position.

DESCRIPTION OF THE PREFERRED EMBODIMENT

The concepts embodied in the manually foldable top for automobile vehicles of the present invention may be applicable to various automobile vehicles, without departing from the scope of the invention.

Figure 1:
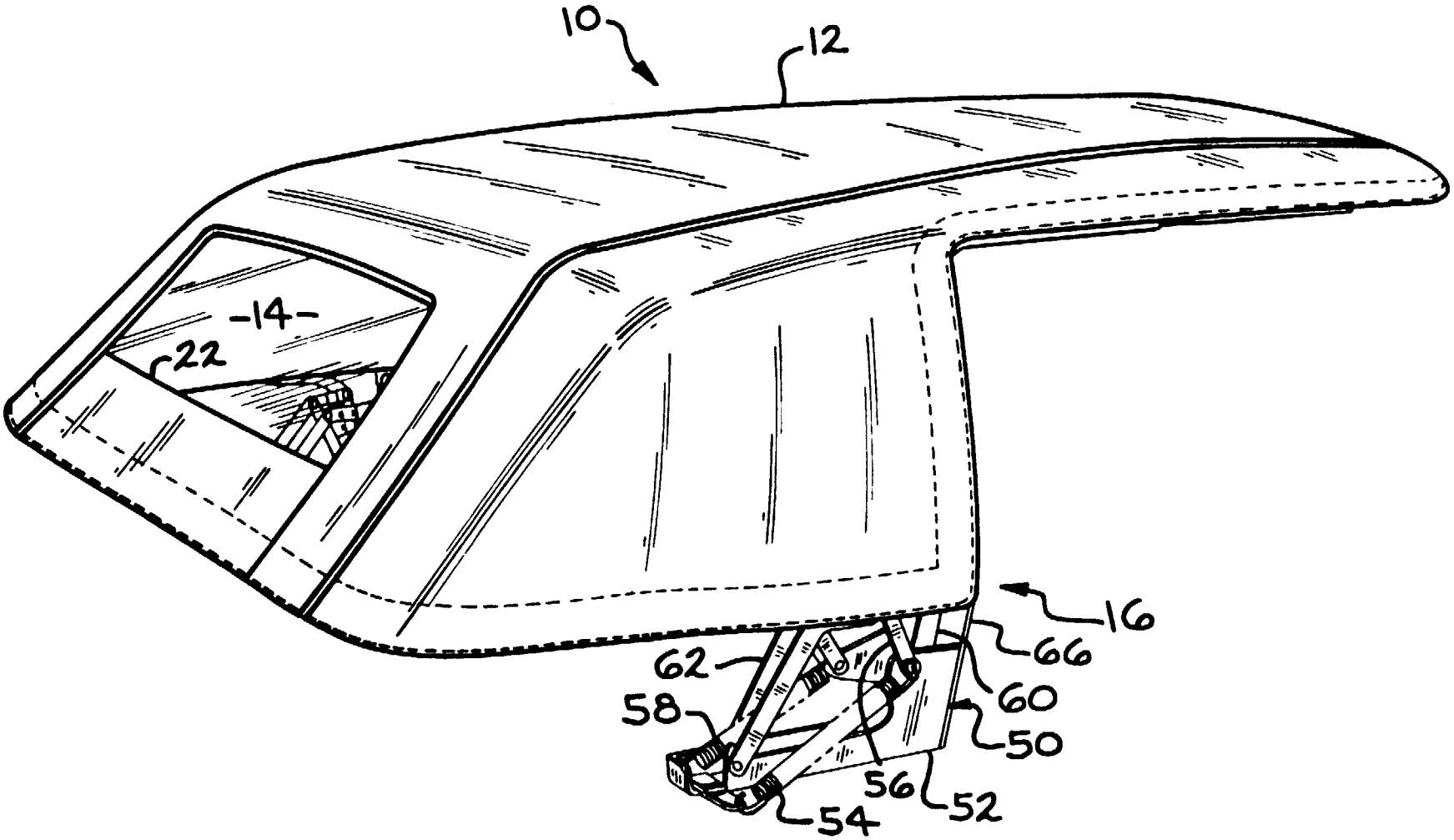
FIG. 1 is a perspective view of a manually foldable top for automobile vehicles, according to the present invention, shown in the closed position.

Referring now to the drawings and to FIG. 1 in particular, a manually foldable top 10 for use in automobile vehicles is shown. The top 10 generally includes a fabric roof 12, a back window or backlite 14, and a bracket assembly 16. The fabric roof 12 is operatively connected to the bracket assembly 16 by means which are conventionally known in the automobile art.

The manually foldable top 10 of the present invention is especially useful for mounting a glass backlite. The glass backlite folds into the bracket assembly 16 as the foldable top is moved to an open position. Referring now to FIGS. 2-5, in particular to FIGS. 2 and 3, the glass backlite 14 is operatively mounted in the foldable top 10. The base 20 of the backlite 14 is secured to a generally horizontally positioned portion 22 (See FIG. 1) of the roof 12. The backlite 14 further includes a synthetic material 26 which extends around the perimeter of the backlite 14. The synthetic material 26, which adheres when pressed together with an opposing synthetic material 46, on the exterior portion of the trim 44, as shown in FIG. 3. A particularly suitable material would be a Velcro® type material, a synthetic material which adheres when pressed together. The backlite 14 further includes a mounting bracket 30 positioned on the interior side of backlite 14 as can be clearly seen in FIG. 2. The mounting bracket 30 is operatively connected to a slotted hinge mechanism 32. The slotted hinge mechanism 32 has a generally arcuate shape and includes a generally arcuate slot 34 positioned at a first end 33 of the hinge mechanism 32 adjacent the mounting bracket 30. The hinge mechanism 32 is operatively connected to the mounting bracket 30 by a nut assembly 36. As shown in FIG. 5 the nut assembly 36 passes through the slot 34 and engages the mounting bracket 30. The slotted hinge mechanism 32 further includes a second end 38 which is operatively attached to a portion of the fabric roof 12 by a pivotally mounted nut and bolt assembly 40, as seen in FIGS. 2 and 5. The nut and bolt assembly 40 is operatively connected to a metal bow 42 which extends into the fabric roof 12. The second end 38 of the hinge mechanism 32 includes an aperture 39 through which the nut and bolt assembly 40 are operatively connected. The nut and pin assembly 40 allows the hinge mechanism 32 to rotatably move around the pin assembly 40 in a generally arcuate path.

Figure 15:
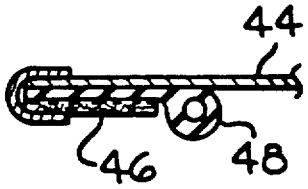
FIG. 15 is a view taken along the line 15—15 in FIG. 2.

Referring now to FIG. 3, the glass backlite 14 is sealably mounted to a portion 44 of the fabric roof 12. The fabric portion 44 includes an opposing material 46 which engages the opposing material 26 to form a sealed window when the foldable top 10 is in the closed position. In order to open the back window and break the seal formed by the materials 26 and 46 the operator merely lifts the bottom fabric support rail 56 to a vertical position. The material 26 on the backlite 14 will automatically release from the material 46 on fabric portion 44. (See FIG. 15). In addition to the material 46 on fabric portion 44, a rubber seal 48 is sewn to cloth top 44. This rubber seal 48 will help seal the cloth top 44 to the backlite 14 when the top is in the up or closed position. As the backlite 14 is pivoted inwardly, the mounting bracket 30 slideably moves along the slot 34 in the slotted hinge mechanism 32 which in turn also causes the slotted hinge mechanism 32 to pivotally move around the nut and bolt assembly 40 causing the fabric material of the roof 12 to be pulled down on top of the glass backlite 14.

Figures 6, 7:
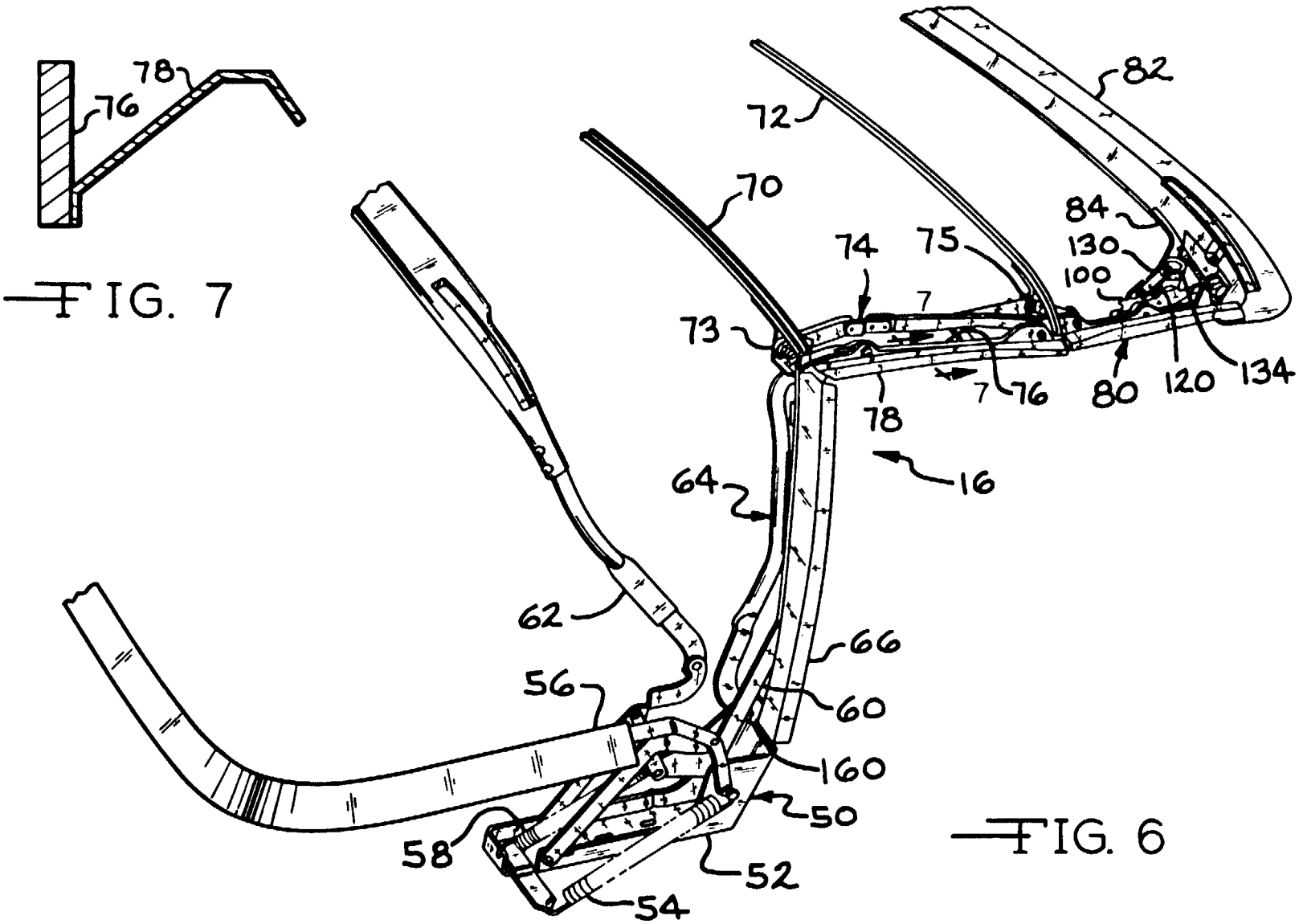
FIG. 6 is a perspective view of one-half of a top assembly of the foldable top in the closed position.
FIG. 7 is a view taken along line 7—7 in FIG. 6.

Referring now to FIG. 6, the top assembly is generally shown in an unfolded or closed position. The fabric cover has been omitted for the sake of clarity. It is to be understood that two mutually opposing side arm assemblies 16 form the framework for the foldable top 10. For the sake of clarity, only one of the side arm assemblies 16 is shown.

The side arm assembly 16 includes a self-contained spring assembly 50 which is mounted to the vehicle body (not shown). The self-contained spring assembly 50 includes a main pivot bracket 52 which mounts directly on the vehicle body. The self-contained spring assembly 50 includes a first spring 54 operatively connected at one end to the main pivot bracket 52 and at the opposing end to a bottom fabric support rail and linkage assembly 56. A second spring 58 is operatively connected at one end to the main pivot bracket 52 and at the opposing to a roof column support and linkage assembly 60. The spring 58 acts to reduce the effort required to raise the top assembly 10 to a full up position. The "pop-up" spring 54 acts to raise the bottom which will allow the top assembly 10 to be lowered without having the bottom fabric support rail 56 drag across or interfere with any vehicle body [body] components. The roof column support and linkage assembly 60 also includes a housing 66 for the roof fabric, window seals, and side windows (not shown). The housing 66 for the fabric and window seals extends outwardly from the roof column support and linkage assembly 60 in a direction away from the balance linkage assembly 64. The housing 66 generally forms either a U- or C-shaped channel through which the window (not shown) travels and is secured when the window is in the closed position.

The main pivot bracket 52 is also operatively connected to a bow and linkage assembly 62 which extends upwardly and rearwardly at an acute angle from the main pivot bracket 52 such that the bow and linkage assembly 62 forms the rear portion of the roof 12 which is generally adjacent the top of the backlite 14.

The side arm assembly 16 further includes a first fabric support bow 70 and a second fabric support bow 72 which are operatively connected to a linkage assembly 74. The linkage assembly 74, at its first end 73, is operatively connected to and extends from the roof column support and linkage assembly 60 at a generally right angle when the top 10 is in the closed position. The fabric support bows 70 and 72 and the fabric support linkage assembly 74 act to keep the roof fabric taut when the top 10 is in the closed position. The linkage assembly 74 is operatively connected at its end 75 opposing the roof column support and linkage assembly 60 to a front linkage and securing assembly 80. The linkage assembly 74 includes a main support 76, as can be seen in the cross-section shown in FIG. 7, and a center rail seal carrier 78 which extends at an acute angle from the main support in a direction away from the linkage assembly 74. The center rail seal carrier 78 acts as a housing for the roof fabric 12, the window seals and the side window of the vehicle (not shown). The housing 78 generally forms either a U- or C-shaped channel in which the window is secured when the window is in the closed position.

Figure 12:
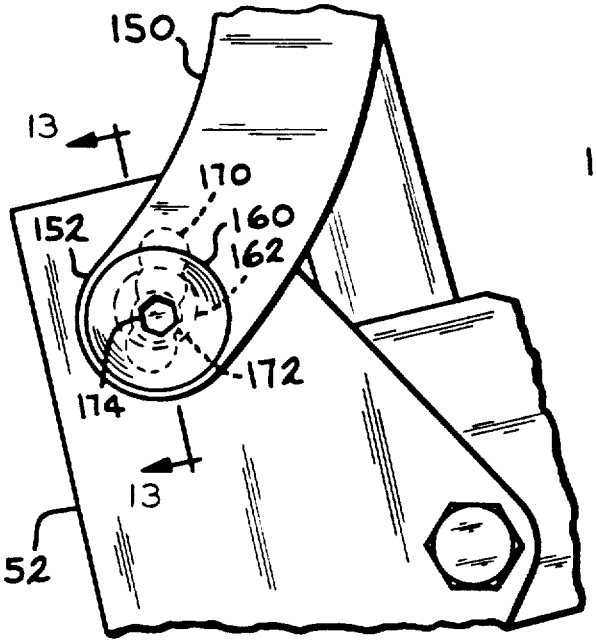
FIG. 12 is a side elevational view of part of a pivot bracket assembly, according to the present invention.

The main pivot bracket 52 is further operatively connected to a multiple adjustment mechanism 64 which extends in a generally parallel direction to the roof column support and linkage assembly 60. The multiple adjustment mechanism 64 is connected at its first end to the main pivot bracket 52 and at its second end to the linkage assembly 74, as will be discussed in more detail in reference to FIGS. 12-14.

The front linkage and securing assembly 80 is operatively connected to a header assembly 82 which is positioned in a generally parallel manner to the front windshield (not shown) when the foldable roof is in the closed position.

Figure 8:
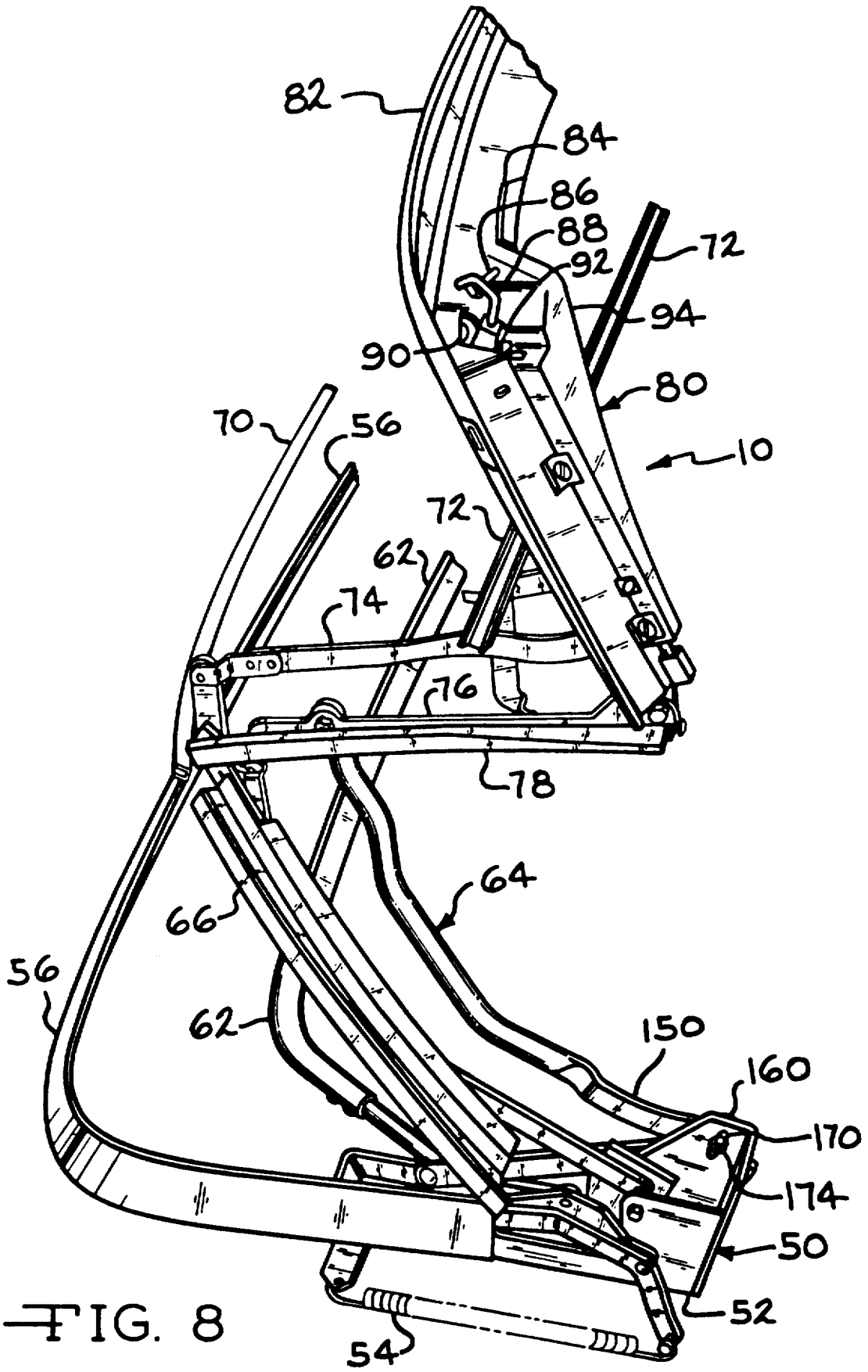
FIG. 8 is a perspective view of one-half of the top assembly of the foldable top in a partially open or folded position.
Figure 9:
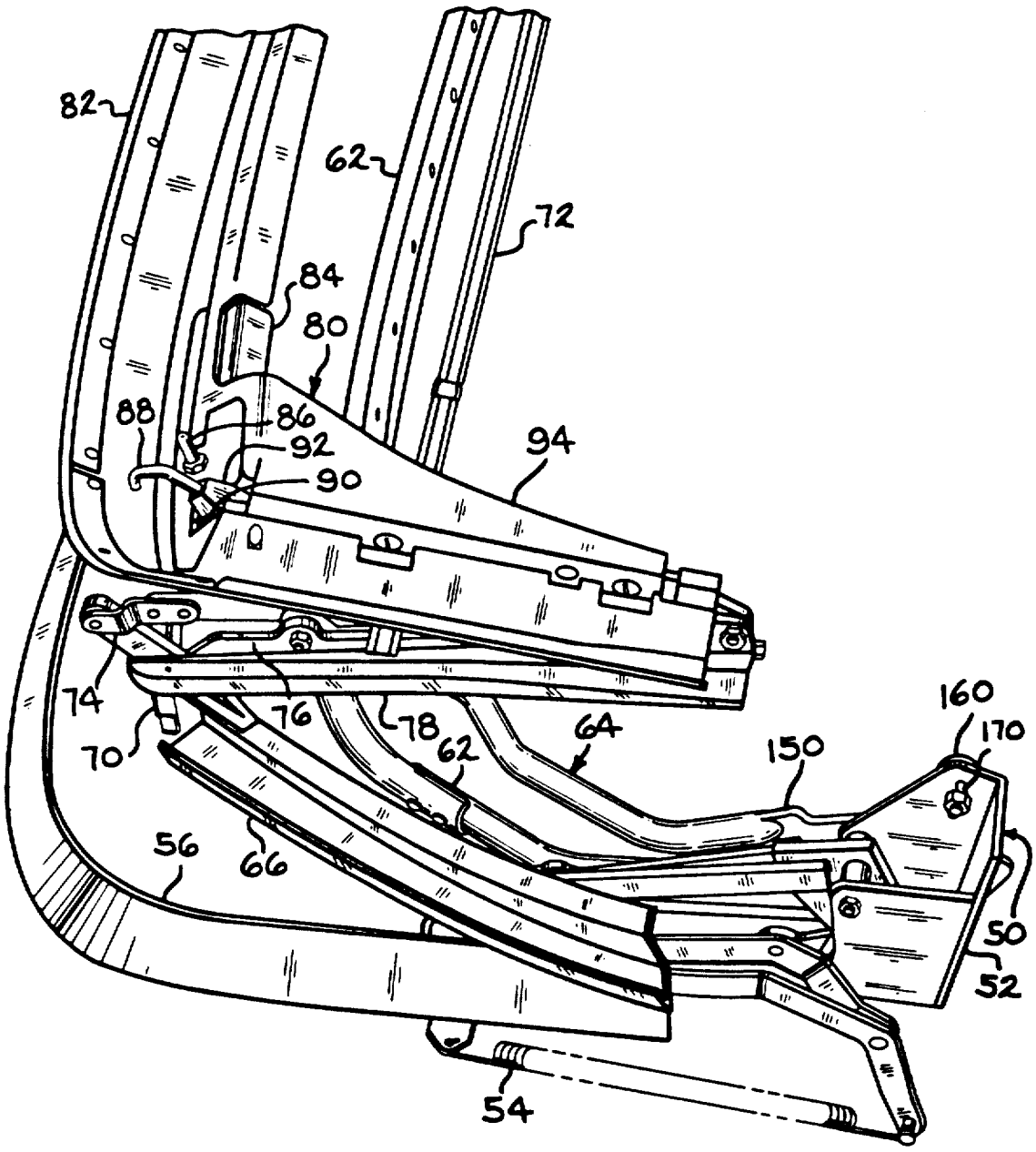
FIG. 9 is a perspective view of one half of the top assembly in the folded or open position.

Referring now to the header assembly 82 and to FIGS. 8 and 9, a handle 84 is positioned adjacent the side of the header assembly 82 opposite the side where the front linkage and securing assembly 80 is connected. The header assembly 82 further includes a locating pin 86 and a generally J-shaped securing hook 88. The locating pin 86 slideably fits into an aperture (not shown) in the windshield frame (not shown) and vehicle body (not shown) such that the foldable top 10, when in the closed position, is securely fastened to the vehicle body (not shown). In a like manner, the securing hook 88 is positioned adjacent a securing mechanism (not shown) on the windshield frame such that the foldable top 10, when in the closed position, is held in a secure and taut manner. The securing hook 88 extends through an aperture 90 in the header assembly 82 in a direction away from the front linkage and securing assembly 80. The header assembly 82 further includes a housing portion 94 which extends outwardly in a direction away from the corner of the header assembly 82 and which protects the front linkage and securing assembly 80.

When the securing hook 88 is released the operator then collapses the folding top 10 upon itself, as shown in FIGS. 8 and 9. The various linkage assemblies operatively pivot to enable the rear rail and linkage assembly 62 and the roof column support and linkage assembly 60 to collapse into a horizontal position, thus allowing the first and second fabric support bows 70 and 72 to pivot through the linkage assembly 74 and also collapse into a generally horizontal position. The front linkage and securing assembly 80 and the header assembly 82 then pivot rearwardly and also collapse in a generally horizontal position.

In order to release the J-shaped securing hook 88 from the windshield frame and to allow the top 10 to be opened, the front linkage and securing assembly 80 must be activated. Referring now to FIGS. 10 and 11, the operator grasps the handle 84 and pulls the handle 84 in a rearward direction in order to released the securing hook 88. The securing hook 88 is connected at an end 92 opposite the J-shaped portion of the hook 88 to the front linkage and securing assembly 80 as follows: the front linkage assembly 80 includes a lever mechanism 100 which is connected at its first end 102 to the end portion 92 of the securing hook 88 by means of a pin assembly 104. The end portion 92 pivots around the pin assembly 104 in a direction away from the front linkage and securing assembly 80. The end portion 92 of the securing hook 88 further pivots around a fixed point 106 on the header assembly 82, as seen in FIG. 10. When the securing hook 88 pivots through the aperture 90, the end 92 pivots around the pin assembly 104 and cams around the fixed point 106. The lever 100 also includes a slot 108 which is located in opposed relationship to the pin assembly 104. A further pin assembly 110 extends through the slot 108 and operatively mounts to a support bracket 112 to the front linkage and securing assembly 80.

The lever mechanism 100 further includes a housing portion 114 which extends in a direction away from the support bracket 112. The housing portion 114 terminates in an extending portion 116 through which a connecting lever 120 is attached. The connecting lever 120 includes a first pivot pin 122 which extends through the extending terminal portion 116 of the housing portion 114 and operatively connects the connecting lever 120 to the lever mechanism 100. The connecting lever 120 includes a second pivot pin 124 which is in opposing relationship to the first pivot pin 122. The second pivot pin 124 extends through the connecting lever 120 and extends through the handle 84. The handle 84 includes a first end 132 which is adjacent the connecting lever 120. The second pivot pin 124 extends through the first end 132 of the handle 84 and through the connecting lever 120 to operatively connect the lever mechanism 100, via the connecting lever 120, to the handle 84. The handle 84 further includes a main pivot pin assembly 134 which is located at the first end 132 of the handle 84 and is adjacent the second pivot pin 124. The main pivot pin assembly 134 extends through the first end 132 in a substantially parallel relationship to the second pivot pin 124.

The handle 84 includes a second end 136 which terminates at the handle 84. The second end 136 includes a notched portion 138 which engages a securing bar 140 on the header assembly 82. The handle 84 further includes a tab portion 142 which extends upwardly from the plane of the handle 84. A return spring 144 is operatively connected at one end to the tab portion 142 and at its opposite end to a flange portion 146 which extends from the header assembly 82 in a direction toward the front linkage assembly 80.

A typical opening and closing operation for the front linkage and securing assembly 80, in accordance with the present invention, in connection with a manually foldable top for automobile vehicles is as follows: The operator grasps the handle 84 and pulls the handle 84 in a rearward direction away from the header assembly 82. As the handle 84 is pulled open, the notched portion 138 disengages from the securing bar 140. The handle 84, which forms a portion of the second end 136, rotates in an arcuate direction away from the header assembly 82. The handle 84 pivots about the main pivot pin assembly 134 in a direction towards the rear of the side arm assembly 16. As a handle 84 pivots about the main pivot pin assembly 134, the first end 132 of the handle 84 pivots in a direction toward the header assembly 82. The pivoting of the handle 84 in turn causes the connecting lever 120 to pivot about the second pivot pin 124. The handle 84 acts to pivot or pull the connecting lever 120, along with the first end 132, in a direction toward the header assembly 82. As the connecting lever 120 pivots about the second pivot pin 124, the connecting lever 120 further pivots around the first pivot pin 122. As the first end 132 of the handle 84 continues to travel in a direction toward the header assembly 82, the handle 84 pulls the connecting lever 120 toward the header assembly 82 also. The connecting lever 120, which is operatively connected to the lever mechanism 100 through the extending terminal portion 116 and the housing portion 114, is moved in a direction toward the header assembly 82. The connecting lever 120 acts to pull the lever 100 along with it such that the slot 108 in the lever 100 allows the lever 100 to slideably move across the pin assembly 110. The lever 100 is thus also pulled in a direction toward the header assembly 82. As the lever 100 is pulled by the connecting lever 120 and the handle 84, the first end 102 of the lever 100 rotates about the pin asssembly 104 thus causing the end 92 of the securing hook 88 to pivot on the pin assembly 104 and to also cam around the fixed point 106 such that the securing hook 88 pivots through the aperture 90 in the header assembly 82. The pivoting of the securing hook 88 allows the securing hook 88 to be released from the securing portion (not shown) on the front windshield frame (not shown).

When the front linkage and securing assembly 80 is in the locked position, as shown in FIG. 10, the handle 84 and the connecting lever 120 are locked in a position past center such that positive force on the handle 84 is necessary to move both the first end 132 of the handle 84 and the connecting lever 120 passed center to start disengagement of the securing hook 88.

Referring now to FIGS. 6 and 12–14, it is necessary when the manually foldable top 10 is in a locked or closed position that all hinge mechanisms are securely engaged. Due to the complexity of the side arm assembly 16 and the various linkage assemblies contained therein, it is often difficult to manufacture and install a side arm assembly 16 according to the desired manufacturing tolerance. This is especially noticeable when a side arm assembly 16, such as disclosed herein, contains numerous linkage and hinge mechanisms which build up tolerance in each mechanism. Since it is important to have the manually foldable top sit securely on the vehicle and to have the locating pin 86 and the securing hook 88 securely engaged in the windshield frame (not shown), the side arm assembly 16 further contains a multiple adjustment mechanism 64.

Figure 13:
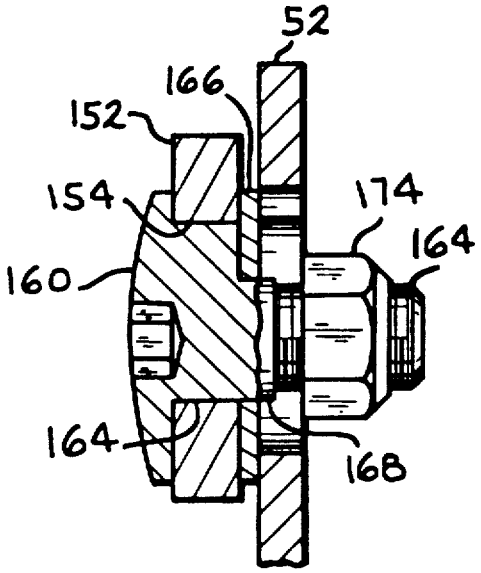
FIG. 13 is a view taken along line 13—13 in FIG. 12.
Figure 14:
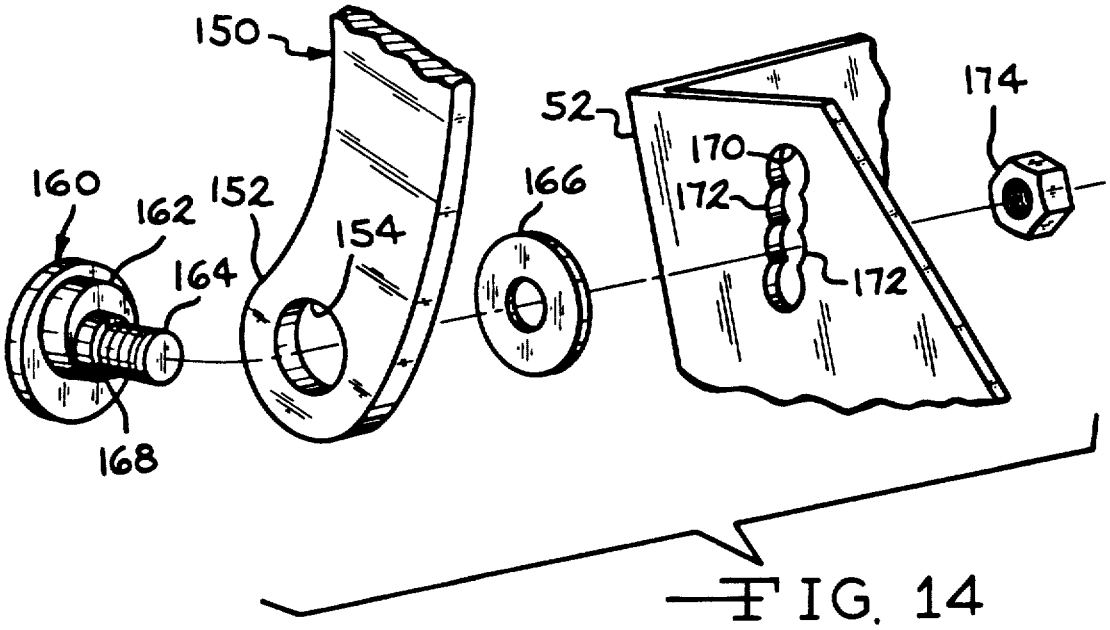
FIG. 14 is an exploded perspective view of the pivot bracket assembly shown in FIG. 12.

The multiple adjustment mechanism 64 includes a balance link 150 having a first end 152 which is operatively connected to the main pivot bracket 52. The first end 152 of the balance link 150 includes an aperture 154. A camming bolt 160 is positioned within the aperture 154 in the first end 152 of the balance link 150. As seen in FIGS. 13 and 14, the camming bolt 160 includes an ecentrically mounted cam portion 162, a centrically mounted threaded screw portion 164, and a shoulder 168. The ecentrically mounted camming portion 162 is engageably mounted within the aperture 154 in the balance link 150. A washer or spacer 166 is positioned between the balance link 150 and the main pivot bracket assembly 52.

The main pivot bracket 52 includes a slot or elongated aperture 170 through which the threaded portion 164 of the camming bolt 160 extends. The slot 170 includes a plurality of holes 172 which are arranged in a substantially linear manner along the slot 170. Each hole 172 defines a diameter which is complimentary with the shoulder 168 such that, when the shoulder 168 extends through a hole 172, the camming bolt 160 is secured within that particular hole 172, as can be seen by the view shown in FIG. 14. A bolt or securing nut 174 is positioned on the threaded portion 164 and secures the camming bolt 160 to the balance link 150 and the main pivot bracket 52. The shoulder 168 allows the cam bolt 160 to be repositioned to a new hole 172, as required during the adjustment procedures, while having the nut 174 only loosened, and not removed.

When the side arm assembly 16 is mounted on a vehicle, the assembler will determine which of the various holes 172 within the slot 170 on the main pivot bracket 52 most nearly compensates for the various tolerances built into the various linkage assemblies. It is important that all linkage mechanisms have some tolerances so that there is minimal torquing and bending of the side arm assembly 16. Once the desired hole 172 is chosen, the camming bolt 160 is secured within that particular hole 172 of the slot 170. Then, as the side arm assembly 16 and the foldable top 10 are moved to the closed position, the forward movement of the side arm assembly 16, and in particular, the header assembly 82 and front linkage and securing assembly 80 are moved into position, the forward motion of the side arm assembly 16 causes the multiple adjustment mechanism 64 and the balance link 150 to rotate or cam about the camming portion 162 of the camming bolt 160 thereby allowing an extra measure of tolerance within the side arm assembly 16; or, if necessary, allowing for the removal of slack in the side arm assembly 16 such that the operator of the foldable top 10 can accurately align the locating pin 86 and securing hook 88 in their respective proper places along the front windshield frame (not shown).

Various modifications can be made with respect to the disclosed embodiment without departing from the scope of the invention as defined in the following claims.

What I claim is:

1. A manually foldable top for automobile vehicles which includes:

means for installing the foldable top on a vehicle body including a spring assembly operatively attached to a side arm assembly for movement of the top from a closed position to an open position;

means for moving a back window on the top between an open and a closed position, including means for forming a sealed window when the window is in the closed position; the means for moving the back window on the foldable top between the open and closed position including a hinge mechanism having a first end connected to the back window and a second end connected to the foldable top, the hinge mechanism including a mounting bracket connected to an interior portion of the back window and a slotted hinge mechanism operatively connected thereto, the slotted hinge mechanism having a generally arcuate shape and including a generally arcuate slot positioned in the first end of the hinge mechanism adjacent the mounting bracket, the hinge mechanism pivotally connected to the mounting bracket by a nut assembly, the second end of the slotted hinge mechanism operatively attached to a first portion of the foldable top by a pivotally mounted nut and bolt assembly for movement of the back window between the open and closed position;

means for securing the top to the vehicle body when the top is in the closed position, including a linkage and securing assembly which releasably attaches to the vehicle body; and, means for adjusting the position of the foldable top with respect to the vehicle body during installation of the foldable top on the vehicle body and during the movement of the foldable top between the open and closed positions.

2. The manually foldable top according to claim 1, wherein the back window is sealably mounted to a second portion of the foldable top, the second portion having a self-adhesive material on at least a portion of the foldable top adjacent the back window, the back window having an opposing self-adhesive material in opposition adjacent relationship to the self-adhesive material on the foldable top such that when the window is in a closed position the self-adhesive materials are engaged to form a seal.

3. The manually foldable top according to claim 2, wherein the back window is made substantially of glass.

4. The manually foldable top according to claim 1, wherein the linkage and securing assembly is operatively connected to a header assembly which includes a locating pin and a securing hook such that the foldable top, when in the closed position, is securely fastened to the vehicle body.

5. The manually foldable top according to claim 4, wherein the linkage and securing assembly includes a lever mechanism connected at its first end to an end portion of the securing hook by a pin assembly, the end portion of the securing hook pivoting around the pin assembly in a direction away from the linkage and securing assembly and the end portion further pivoting around a fixed point on the header assembly through an aperture in the header assembly such that the securing hook is released from its locked position on the header assembly to allow the top to be moved to its open position.

6. The manually foldable top according to claim 5, wherein the lever mechanism further includes a slot located in opposed relationship to the pin assembly and further including a second pin assembly extending through the slot and operatively mounting a support bracket to the linkage and securing assembly, the lever mechanism further including a housing portion extending in a direction away from the support bracket and terminating in an extending portion, the extending portion being operatively connected to a connecting lever which includes a first pivot pin extending through the terminal portion of the housing portion and operatively connecting the connecting lever to the lever mechanism;

the connecting lever further including a second pivot pin in opposing relationship to the first pivot pin which extends through the connecting lever and operatively connects the connecting lever to a handle;

the handle being operatively connected to the lever mechanism through the connecting lever;

the handle further including a main pivot pin assembly located at a first end of the handle adjacent the second pivot pin;

the handle further including a second end having a notched portion which engages a securing mechanism on the header assembly;

whereby movement of the handle in a direction away from the securing mechanism on the header assembly operatively releases the securing hook.

7. The manually foldable top according to claim 6, wherein the handle further includes a return spring operatively connected at one end of the handle and at its opposite end to the header assembly whereby the handle is returned to a position adjacent the header assembly after release of the securing hook.

8. The foldable top according to claim 1, wherein the means for adjusting the position of the foldable top with respect to the vehicle body includes a multiple adjustment mechanism including a balance link operatively connected to the spring assembly by a camming [belt] *bolt* positioned within an aperture in the spring assembly.

9. The manually foldable top according to claim 8, wherein the camming bolt includes an eccentrically mounted cam portion and a centrically mounted portion, the eccentrically mounted camming portion being engageably mounted within the aperture in the balance link.

10. The manually foldable top according to claim 9, wherein the aperture includes a plurality of holes arranged in a substantially linear manner along the aperture, each of the holes defining a diameter which is complementary with the diameter of the centrically mounted portion of the camming bolt such that when the centrically mounted portion extends through a hole, the camming bolt is secured within that particular hole.

*11. A manually foldable top for automobile vehicles which includes:*

*a collapsible support linkage mechanism including a fabric support bow and a bottom support rail;*

*means for installing the foldable top linkage mechanism on a vehicle body to enable movement of the top between a closed position and an open folded position;*

*a fabric roof mounted on the linkage mechanism and having a rear opening and a lower horizontal portion connected to the bottom support rail and defining the lower edge of the rear opening;*

*a back window having its lower edge attached to the lower horizontal portion of the roof and movable between open and closed positions relative to the rear opening;*

*adhesive materials on the fabric around the rear opening and on the window periphery interengageable to form a sealed window when the window is in the closed position; and*

*means for moving the back window between open and closed positions relative to the rear opening, comprising a slotted hinge mechanism pivotally attached to the roof, and a pin carried by the rear window and slidable in the slot to enable the window to disengage the adhesive materials and move away from the opening upon relative movement of the bottom support rail toward the support bow, thus facilitating folding of the top to said open position.*

* * * * *